(12) United States Patent
Li et al.

(10) Patent No.: US 11,126,876 B2
(45) Date of Patent: Sep. 21, 2021

(54) METHOD FOR RECOGNIZING TRAFFIC LIGHT, DEVICE, AND VEHICLE

(71) Applicant: BAIDU ONLINE NETWORK TECHNOLOGY (BEIJING) CO., LTD., Beijing (CN)

(72) Inventors: Qi Li, Beijing (CN); Han Gao, Beijing (CN); Yilin Gui, Beijing (CN); Tian Xia, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 118 days.

(21) Appl. No.: 16/563,520

(22) Filed: Sep. 6, 2019

(65) Prior Publication Data

US 2020/0082186 A1 Mar. 12, 2020

(30) Foreign Application Priority Data

Sep. 7, 2018 (CN) .......................... 201811043091.1

(51) Int. Cl.
*G06K 9/00* (2006.01)
*G08G 1/095* (2006.01)
*G06K 9/72* (2006.01)

(52) U.S. Cl.
CPC ......... *G06K 9/00825* (2013.01); *G06K 9/726* (2013.01); *G08G 1/095* (2013.01)

(58) Field of Classification Search
CPC ............... G08G 1/09626; G08G 1/095; G08G 1/09623; G06K 9/726; G06K 9/00825
See application file for complete search history.

(56) References Cited

U.S. PATENT DOCUMENTS

| 8,761,991 | B1 | 6/2014 | Ferguson et al. |
| 8,818,043 | B2 * | 8/2014 | Fairfield ............. G05D 1/0212 382/104 |

(Continued)

FOREIGN PATENT DOCUMENTS

| CN | 106297341 A | 1/2017 |
| CN | 106663374 A | 5/2017 |

(Continued)

OTHER PUBLICATIONS

Barnes, D. et al., "Exploiting 3D Semantic Scene Priors for Online Traffic Light Interpretation" 2015 IEEE Intelligent Vehicles Symposium (IV) Jun. 1, 2015, pp. 573-578.

(Continued)

*Primary Examiner* — Brenda C Bernardi
(74) *Attorney, Agent, or Firm* — Lathrop GPM LLP

(57) ABSTRACT

Embodiments of the present disclosure provide a method and an apparatus for recognizing a traffic light, a device, a storage medium, and a vehicle. The method may include: obtaining semantic information of one or more traffic lights provided at an intersection, and recognizing states of the one or more traffic lights in an image captured by a camera; determining traffic lights representing same semantics from the one or more traffic lights based on the semantic information, and determining a uniform state corresponding to the traffic lights representing the same semantics according to states of the traffic lights representing the same semantics and preset confidences of respective traffic light states; and determining indication information of the traffic lights representing the same semantics according to the uniform state.

18 Claims, 3 Drawing Sheets

(56) References Cited

U.S. PATENT DOCUMENTS

| | | |
|---|---|---|
| 9,158,980 B1 | 10/2015 | Ferguson et al. |
| 9,990,548 B2 | 6/2018 | Wellington et al. |
| 2017/0316273 A1 | 11/2017 | Ferguson et al. |
| 2018/0053059 A1 | 2/2018 | Mei et al. |
| 2018/0112997 A1 | 4/2018 | Fasola et al. |
| 2018/0257615 A1* | 9/2018 | Rawashdeh ............... B60T 7/12 |

FOREIGN PATENT DOCUMENTS

| | | |
|---|---|---|
| CN | 106794841 A | 5/2017 |
| CN | 106875707 A | 6/2017 |
| CN | 107187447 A | 9/2017 |
| CN | 107690659 A | 2/2018 |
| CN | 108482378 A | 9/2018 |
| WO | WO 2015177864 A1 | 11/2015 |

OTHER PUBLICATIONS

European Patent Application No. 19195579.8 extended Search and Opinion dated Feb. 14, 2020, 10 pages.
Chinese Patent Application No. 201811043091.1 Office Action dated May 7, 2020, 11 pages.
Chinese Patent Application No. 201811043091. English translation of Office Action dated May 7, 2020, 17 pages.
Japanese Patent Application No. 2019-163302 Office Action dated Dec. 1, 2020, 5 pages.
Japanese Patent Application No. 2019-163302 English translation of Office Action dated Dec. 1, 2020, 5 pages.

* cited by examiner

METHOD FOR RECOGNIZING TRAFFIC LIGHT, DEVICE, AND VEHICLE

CROSS-REFERENCE TO RELATED APPLICATION

This application claims priority to and benefits of Chinese Patent Application Serial No. 201811043091.1, filed with the State Intellectual Property Office of P. R. China on Sep. 7, 2018, the entire content of which is incorporated herein by reference.

FIELD

The present disclosure relates to the field of unmanned vehicle technologies, and more particularly, to a method for recognizing a traffic light, an electronic device, a storage medium, and a vehicle.

BACKGROUND

An unmanned vehicle needs to sense the states of the traffic lights provided at an intersection when traveling to the intersection. The states of the traffic lights include a red-light state, a green-light state, a yellow-light state, an all-off state, a green-blink state, and the like.

At present, unmanned vehicles are typically provided with a camera, and the states of the traffic lights can be sensed by performing detection and color recognition of the traffic lights on an image captured by the camera.

Because the condition at the intersection is complex, sometimes, the traffic lights may be damaged (i.e. the light is off), abnormally displayed, covered or in a blink state. Under these circumstances, the state of the traffic light may not be obtained correctly.

SUMMARY

Embodiments of the present disclosure provide a method for recognizing a traffic light. In one embodiment, the method includes: obtaining semantic information of one or more traffic lights provided at an intersection, and recognizing states of the one or more traffic lights in an image captured by a camera; determining traffic lights representing same semantics from the one or more traffic lights based on the semantic information, and determining a uniform state corresponding to the traffic lights representing the same semantics according to states of the traffic lights representing the same semantics and preset confidences of respective traffic light states; and determining indication information of the traffic lights representing the same semantics according to the uniform state.

Embodiments of the present disclosure also provide an apparatus for recognizing a traffic light. The apparatus includes: a recognizing light module, a first determining module and a second determining module.

The recognizing module is configured to obtain semantic information of one or more traffic lights provided at an intersection, and recognize states of the one or more traffic lights in an image captured by a camera;

The first determining module is configured to determine traffic lights representing same semantics from the one or more traffic lights based on the semantic information, and determine a uniform state corresponding to the traffic lights representing the same semantics according to states of the traffic lights representing the same semantics and preset confidences of respective traffic light states.

The second determining module is configured to determine indication information of the traffic lights representing the same semantics according to the uniform state.

Embodiments of the present disclosure also provide an electronic device. The device includes a memory, a processor, and a computer program stored on the memory and executable by the processor. When the computer program is executed by the processor, the method for recognizing a traffic light according to embodiments of the present disclosure is implemented.

Embodiments of the present disclosure also provide a computer readable storage medium having a computer program stored thereon. When the computer program is executed by the processor, the method for recognizing a traffic light according to any one of embodiments of the present disclosure is implemented.

Embodiments of the present disclosure also provide a vehicle. The vehicle includes a vehicle body, the electronic device according to embodiments of the third aspect, and a camera provided on the vehicle body.

DETAILED DESCRIPTION

Detailed description will be further provided below with reference to the accompanying drawings and the embodiments. It should be understood that, detailed embodiments described herein are intended only to explain the present disclosure, and are not intended to limit the present disclosure. In addition, it should be also noted that, for the convenience of description, only some contents but not all the structure related to the present disclosure are illustrated in the accompanying drawings.

First Embodiment

Figure 1:
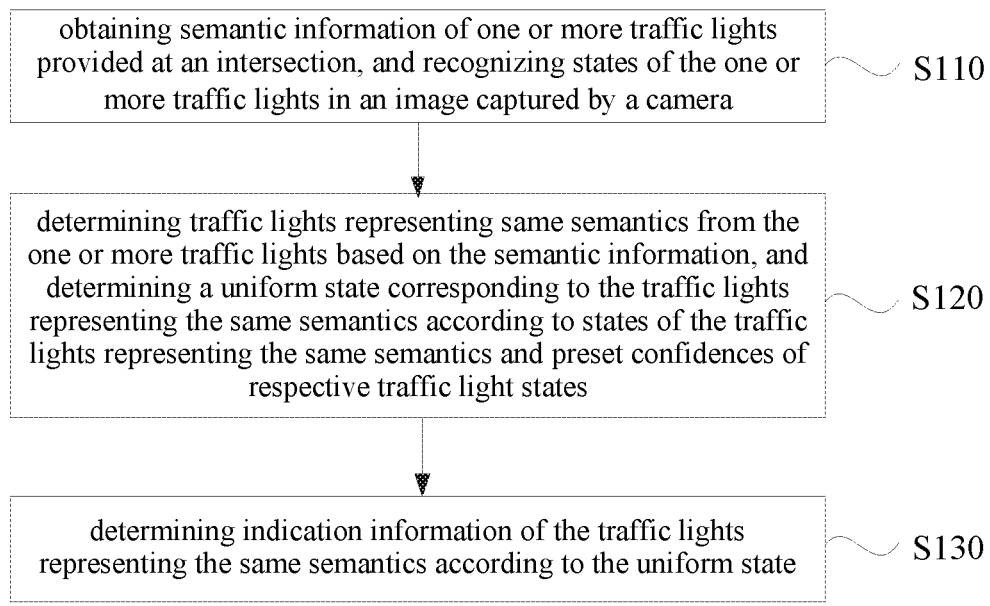
FIG. 1 is a flow chart illustrating a method for recognizing a traffic light in a first embodiment of the present disclosure.

FIG. 1 is a flow chart illustrating a method for recognizing a traffic light in the first embodiment of the present disclosure. This embodiment may be applicable to a case where an unmanned vehicle recognizes a state of the traffic light. The method may be executed by an apparatus for recognizing a traffic light. The apparatus may be implemented in a form of software and/or hardware and generally integrated in a device having a function for recognizing a traffic light. The device may be an electronic device such as a server, a mobile terminal, or an on-vehicle device. As illustrated in FIG. 1, the method includes acts at the following blocks.

At block S110, semantic information of one or more traffic lights provided at an intersection is obtained, and states of the one or more traffic lights are recognized in an image captured by a camera.

The semantic information refers to information representing function of a traffic light. The function may include representing whether straight ahead is allowable, representing whether to left turn is allowable, representing whether right turn is allowable, and the like. The states of the traffic lights may include a red-light state, a green-light state, a yellow-light state, an all-off state and other states. The other states may include a state in which a traffic light is shielded. For example, in an application scenario, the intersection may be provided with a plurality of traffic lights. Semantic information of one part of the plurality of traffic lights may represent whether left turn is allowable, and semantic information of the other part of the plurality of traffic lights may represent whether straight ahead is allowable. That is, one part of the traffic lights is configured to indicate whether the vehicle is allowable to turn left, and the other part of the traffic lights is configured to indicate whether the vehicle is allowable to goes straight.

More specifically, when the unmanned vehicle travels to the intersection, the semantic information of the one or more traffic lights at the intersection is obtained firstly, and then an image recognition is performed on an image of the one or more traffic lights at the intersection captured by the camera, to obtain the states of the one or more traffic lights in the image.

Alternatively, obtaining the semantic information of the one or more traffic lights provided at the intersection and recognizing the states of the one or more traffic lights according to the image captured by the camera may be implemented by: obtaining location information of the one or more traffic lights provided at the intersection and the semantic information of the one or more traffic lights based on map data; and determining position of the one or more traffic lights in the image captured by the camera based on the location information, and recognizing the states of the one or more traffic lights at the position.

In an embodiment, determining the position of the one or more traffic lights in the image captured by the camera based on the location information may be implemented by following actions. Position information of the camera is obtained, a relative position relationship between the camera and each of the one or more traffic lights is obtained according to the position information of the camera, and the position of the one or more traffic lights in the image captured by the camera is determined based on the relative position relationship.

The map data may be obtained according to a conventional navigation application software (such as Baidu map). The map data may include the location information of the one or more traffic lights at the intersection and the semantic information of respective traffic lights at the intersection. In detail, after obtaining the location information of the one or more traffic lights at the intersection, the position of the one or more traffic lights in the image captured by the camera is determined according to the location information, and recognition is performed on the one or more traffic lights at the position in the image to obtain the states of the one or more traffic lights. For example, assuming that four traffic lights in the image are respectively A, B, C, and D, states of A and B are the red-light state, a state of C is the yellow-light state, and a state of D is the all-off light.

At block S120, traffic lights representing same semantics are determined from the one or more traffic lights based on the semantic information, and a uniform state corresponding to the traffic lights representing the same semantics is determined according to states of the traffic lights representing the same semantics and preset confidences of respective traffic light states.

Relationship of the preset confidences of respective traffic light states may be that, confidences of the red-light state, the green-light state and the yellow-light state are identical, the confidence of the red-light state, the green-light state and the yellow-light state is greater than a confidence of the all-off state, and the confidence of the all-off state is greater than a confidence of other states.

For example, traffic lights representing "whether left turn is allowable" and traffic lights representing "whether straight ahead is allowable" in the image may be determined respectively based on the semantic information representing left turn and the semantic information representing straight ahead. A uniform state corresponding to the traffic lights representing "whether left turn is allowable" and a uniform state corresponding to the traffic lights representing "whether straight ahead is allowable" are determined respectively according to the traffic lights representing "whether left turn is allowable", the traffic lights representing "whether straight ahead is allowable", and the preset confidences of respective traffic light states.

Alternatively, determining the uniform state corresponding to the traffic lights representing the same semantics according to the states of the traffic lights representing the same semantics and the preset confidences of respective traffic light states may be implemented by: determining confidences respectively corresponding to the states of the traffic lights representing the same semantics based on the preset confidences of the respective traffic light states; and selecting a state with a maximum confidence from the confidences respectively corresponding to the states of the traffic lights representing the same semantics as the uniform state.

In one aspect, after obtaining the states of respective traffic lights representing the same semantics, a confidence corresponding to a state of each traffic light is determined according to the preset confidences of respective traffic light states. For example, it is assumed that the confidence of the red-light state, the green-light state and the yellow light state is $I_0$, the confidence of the all-off state is $I_1$, the confidence of other states is 12, and $I_0 > I_1 > I_2$. When there are four traffic lights at the intersection representing "going straight", namely A, B, C, and D, states of A and B are the red-light state respectively, a state of C is the yellow-light state, and a state of D is one of other states, a confidence corresponding to A and B is $I_0$, a confidence corresponding to C is $I_0$, and a confidence corresponding to D is 12.

In another aspect, selecting the state with the maximum confidence from the confidences respectively corresponding to the states of the traffic lights representing the same semantics as the uniform state includes: in response to determining that a number of the state with the maximum confidence is one, taking the state with the maximum confidence as the uniform state corresponding to the traffic lights; in response to determining that the number of the states with the maximum confidence is more than one, selecting a state corresponding to a maximum number of traffic lights from the states with the maximum confidence as the uniform state; in response to determining that a number of the state corresponding to the maximum number of traffic lights is one, taking the state corresponding to the maximum number of traffic lights as the uniform state; in response to determining that the number of the states corresponding to the maximum number of traffic lights is more than one, taking a state with a lowest confidence in the preset confidences as the uniform state.

The maximum number of traffic lights may be understood as a maximum number of traffic lights in the same state. For example, assuming that the selected state with the maximum confidence only includes the red-light state, the red-light state is taken as the uniform state corresponding to the traffic lights representing the same semantic. Assuming that the selected states with the maximum confidence include the green-light state and the yellow-light state, a number of traffic lights in the green-light state is two, and a number of traffic light in the yellow-light state is one, the green-light state is taken as the uniform state corresponding to the traffic lights representing the same semantics. Assuming that the selected states with the maximum confidence include the green-light state and the yellow-light state, the number of traffic lights in the green-light state is two, and the number of traffic lights in the yellow-light state is two, other state is taken as the uniform state corresponding to the traffic lights representing the same semantic.

At block S130, indication information of the traffic lights representing the same semantics is determined according to the uniform state.

If the semantic information represents whether left turn is allowable, the indication information may include "turning left directly" and "waiting". If the semantic information represents whether straight ahead is allowable, the indication information may include "going straight directly" and "waiting". In this embodiment, after obtaining the uniform state of the traffic lights representing the same semantics, the indication information is determined based on the semantics according to the uniform state, such that the unmanned vehicle drives according to the indication information. For example, when the obtained uniform state of the traffic lights representing whether left turn is allowable is the green-light state, the indication information is "turning left directly". When the obtained uniform state of the traffic lights representing whether straight ahead is allowable is the red-light state, the indication information is "waiting".

Alternatively, after determining the uniform state corresponding to the traffic lights representing the same semantics, and before determining the indication information of the traffic lights representing the same semantics according to the uniform state, the method also includes: correcting the uniform state according to historical state information corresponding to the traffic lights representing the same semantics.

In one aspect, correcting the uniform state of the traffic lights representing the same semantics may include at least one of the following. The uniform state is corrected to a state at a last time point corresponding to the traffic lights representing the same semantics when the uniform state is one of the other states. The objective of this correction is as follows. When the uniform state is other state, the traffic lights representing the same semantics may be shielded. Therefore, correcting the uniform state to the state at the last time point of the traffic lights representing the same semantics may avoid a problem that a state of the traffic lights may not be detected correctly because the traffic lights are shielded. When the uniform state of the traffic lights representing the same semantics is the all-off state and if the state at the last time point corresponding to the traffic lights representing the same semantics is none of the other states, the uniform state is corrected to the state at the last time point corresponding to the traffic lights representing the same semantics. When the uniform state of the traffic lights representing the same semantics is the yellow-light state and if the state at the last time point corresponding to the traffic lights representing the same semantics is the red-light state, the uniform state of traffic lights is corrected to the red-light state.

The state at the last time point may be a uniform state at the last time point corresponding to the traffic lights representing the same semantics. In this embodiment, when the uniform state corresponding to the traffic lights representing the same semantics is the red-light state or the green-light state, there is no need to correct the uniform state. When the uniform state corresponding to the traffic lights representing the same semantics is other states, the all-off state or the yellow-light state, the uniform state is corrected according to the above ways. It should be noted that, when the uniform state corresponding to the traffic lights representing the same semantics is the yellow-light state, the unified state is corrected because colors of yellow and red are close to each other when the camera captures images at night, and theoretically the state of the traffic lights cannot change from red to yellow. Therefore, the uniform state is corrected when being the yellow-light state, thus improving the accuracy for determining the uniform state.

Alternatively, after obtaining the uniform state corresponding to traffic lights representing the same semantics every time, the uniform state is recorded when the uniform state is one of: the all-off state, the green-light state, the yellow-light state, and the red-light state. It is determined whether there is a traffic light in a blink state among the traffic lights representing the same semantics or whether the traffic lights representing the same semantics are in a fault state according to the uniform state recorded and a frequency of image frame processing.

The frequency of image frame processing may not be lower than a preset threshold, such as 6 fps. In detail, it is determined that the traffic lights representing the same semantics are in the fault state in response to determining that a duration of the uniform state being the all-off state is greater than an upper limit value of a preset range according to the uniform state recorded and the frequency of image frame processing. It is determined that there is a traffic light in an abnormal blink state among the traffic lights representing the same semantics in response to determining that the uniform state is a state alternating between an on-state and the off-state and a duration of the off-state is lower than a lower limit value of the preset range according to the uniform state recorded and the frequency of image frame processing. It is determined there is a traffic light in a normal blink state among the traffic lights representing the same semantics in response to determining that the uniform state is the state alternating between the on-state and the off-state and the duration of the off state is within the preset range according to the uniform state recorded and the frequency of image frame processing.

The preset range may be set as [450 ms, 550 ms]. The 550 ms is the upper limit value. The 450 ms is the lower limit value. Alternatively, when the alternating between an on-state and the off-state of the uniform state is irregular, it may be considered that the blinking is caused by the camera.

With the technical solution in this embodiment, the semantic information of the one or more traffic lights provided at the intersection is obtained, and the states of the one or more traffic lights in the image captured by the camera are recognized, then the traffic lights representing same semantics are determined from the one or more traffic lights based on the semantic information, and the uniform state corresponding to the traffic lights representing the same semantics is determined according to the states of the traffic lights representing the same semantics and the preset confidences of respective traffic light states, and finally the indication information of the traffic lights representing the same semantics is determined according to the uniform state. With the method for recognizing the traffic light provided by embodiments of the present disclosure, one uniform state is determined according to the states of the traffic lights representing the same semantics and the preset confidences of the respective traffic light states, thus determining the instruction information at the intersection, which may improve accuracy for recognizing the traffic light.

Figure 2:
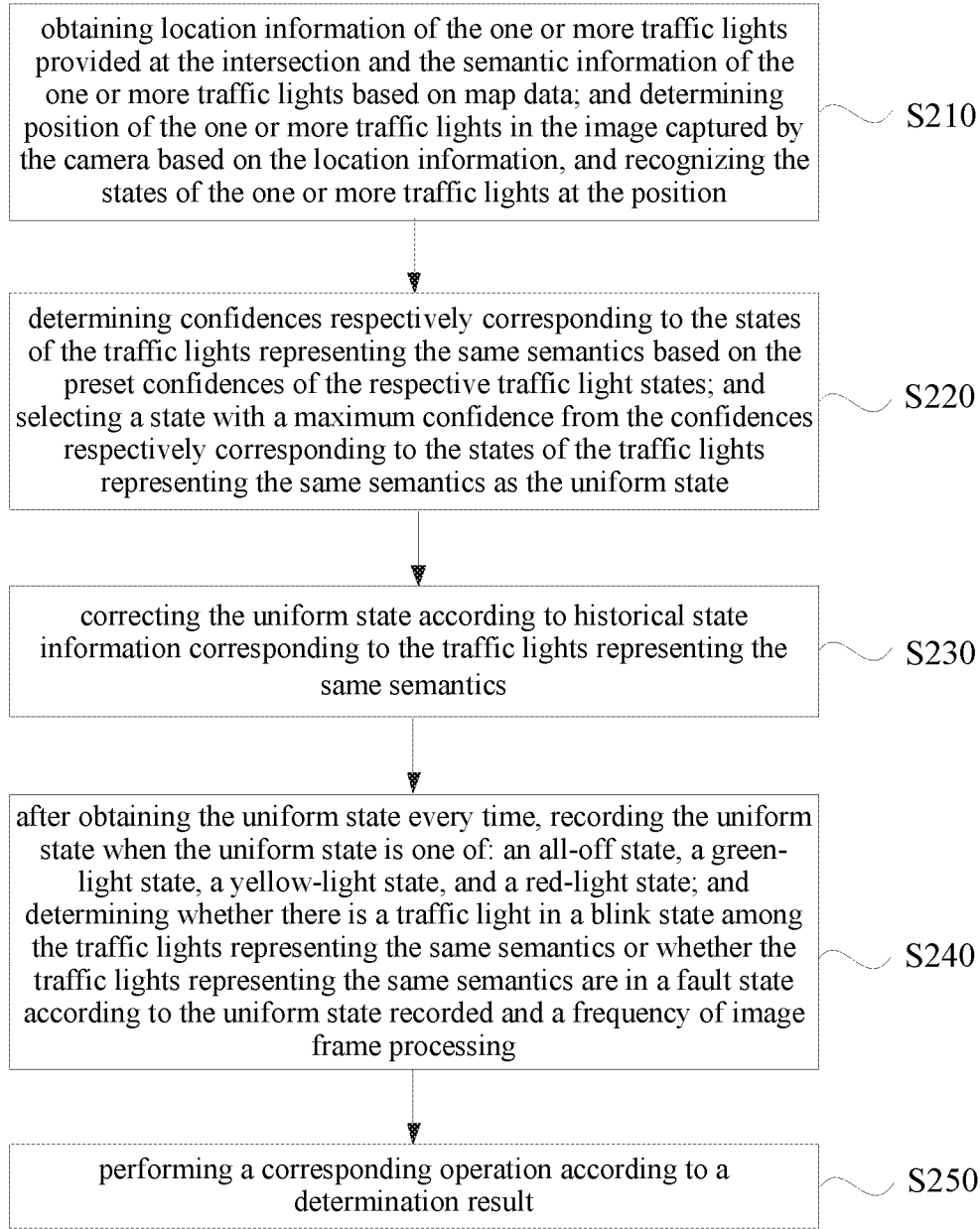
FIG. 2 is a flow chart illustrating a method for recognizing a traffic light in a first embodiment of the present disclosure.

FIG. 2 is a flow chart illustrating a method for recognizing a traffic light in the first embodiment of the present disclosure, which further illustrates the above embodiment. As illustrated in FIG. 2, the method includes acts at the following blocks.

At block S210, location information of the one or more traffic lights provided at the intersection and the semantic information of the one or more traffic lights are obtained based on map data, position of the one or more traffic lights in the image captured by the camera is determined based on the location information, and the states of the one or more traffic lights at the position are recognized.

At block S220, confidences respectively corresponding to the states of the traffic lights representing the same semantics are determined based on the preset confidences of the respective traffic light states, and a state with a maximum confidence is selected as the uniform state from the confidences respectively corresponding to the states of the traffic lights representing the same semantics.

At block S230, the uniform state is corrected according to historical state information corresponding to the traffic lights representing the same semantics.

At block S240, after obtaining the uniform state every time, the uniform state is recorded when the uniform state is one of: an all-off state, a green-light state, a yellow-light state, and a red-light state, and it is determined whether there is a traffic light in a blink state among the traffic lights representing the same semantics or whether the traffic lights representing the same semantics are in a fault state according to the uniform state recorded and a frequency of image frame processing.

At block S250, a corresponding operation is executed according to a determination result.

For example, when the traffic lights representing the same semantics are in the fault state, an operation of pulling over is performed. When there is a traffic light in the abnormal blink state, such as a blink caused by the camera, among the traffic lights representing the same semantics it is considered that the traffic lights representing the same semantics do not blink. A next action to be performed is determined according to a color of the traffic light in the abnormal blink state. For example, when the color of the traffic light in the abnormal blink state is green, it is considered that the actual uniform state corresponding to the traffic lights representing the same semantics is the green-light state, and it is determined that the next action is going straight directly or turning left. When the color of the traffic light in the abnormal blink state is red, it is considered that the actual uniform state corresponding to the traffic lights representing the same semantics is the red-light state, and it is determined that the next action is waiting to go straight or waiting to turn left.

Second Embodiment

Figure 3:
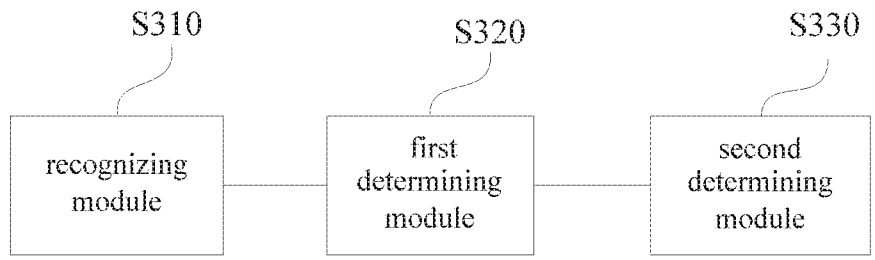
FIG. 3 is a block diagram illustrating an apparatus for recognizing a traffic light in a second embodiment of the present disclosure.

FIG. 3 is a block diagram illustrating an apparatus for recognizing a traffic light in the second embodiment of the present disclosure. As illustrated in FIG. 3, the apparatus includes: a recognizing module 310, a first determining module 320, and a second determining module 330.

The recognizing module 310 is configured to obtain semantic information of one or more traffic lights provided at an intersection, and to recognize states of the one or more traffic lights in an image captured by a camera.

The first determining module 320 is configured to determine traffic lights representing same semantics based on the semantic information from the one or more traffic lights, and to determine a uniform state corresponding to the traffic lights representing the same semantics according to states of the traffic lights representing the same semantics and preset confidences of respective traffic light states traffic lights.

The second determining module 330 is configured to determine indication information of the traffic lights representing the same semantics according to the uniform state.

Alternatively, the recognizing module 310 is also configured to: obtain location information of the one or more traffic lights provided at the intersection and the semantic information of the one or more traffic lights based on map data; and determine position of the one or more traffic lights in the image captured by the camera based on the location information, and recognizing the states of the one or more traffic lights at the position.

Alternatively, the first determining module 320 is also configured to: determine confidences respectively corresponding to the states of the traffic lights representing the same semantics based on the preset confidences of the respective traffic light states; and select a state with a maximum confidence from the confidences respectively corresponding to the states of the traffic lights representing the same semantics as the uniform state.

Alternatively, the first determining module 320 is also configured to: in response to determining that a number of the state with the maximum confidence is one, take the state with the maximum confidence as the uniform state; in response to determining that the number of the states with the maximum confidence is more than one, select a state corresponding to a maximum number of traffic lights from the states with the maximum confidence as the uniform state; in response to determining that a number of the state corresponding to the maximum number of traffic lights is one, take the state corresponding to the maximum number of traffic lights as the uniform state; and in response to determining that the number of the states corresponding to the maximum number of traffic lights is more than one, take a state with a lowest confidence in the preset confidences as the uniform state.

Alternatively, the apparatus also includes: a correction state, configured to correct the uniform state according to historical state information corresponding to the traffic lights representing the same semantics.

Alternatively, the correction module is also configured to: correct the uniform state to a state at a last time point corresponding to the traffic lights representing the same semantics when the uniform state is a shielded state; when the uniform state is an all-off state and the state at the last time point corresponding to the traffic lights representing the same semantics is not the shielded state, correct the uniform state to the state at the last time point corresponding to the traffic lights representing the same semantics; and when the uniform state of the traffic lights is a yellow-light state and the state at the last time point corresponding to the traffic lights representing the same semantics is a red-light state, correct the uniform state to the red-light state.

Alternatively, the apparatus also includes: a recording module, configured to, after obtaining the uniform state every time, record the uniform state when the uniform state is one of: an all-off state, a green-light state, a yellow-light state, and a red-light state; and a third determining module, configured to determine whether there is a traffic light in a blink state among the traffic lights representing the same semantics or whether the traffic lights representing the same semantics are in a fault state according to the uniform state recorded and a frequency of image frame processing.

Alternatively, the third determining module is also configured to: determine that the traffic lights representing the same semantics are in the fault state in response to determining that a duration of the uniform state being the all-off state is greater than an upper limit value of a preset range according to the uniform state recorded and the frequency of image frame processing; determine that there is a traffic light in an abnormal blink state among the traffic lights representing the same semantics in response to determining that the uniform state is a state alternating between an on-state and the off-state and a duration of the off-state is lower than a lower limit value of the preset range according to the uniform state recorded and the frequency of image frame processing; and determine there is a traffic light in a normal blink state among the traffic lights representing the same semantics in response to determining that the uniform state is the state alternating between the on-state and the off-state and the duration of the off state is within the preset range according to the uniform state recorded and the frequency of image frame processing.

Alternatively, the traffic light states include the red-light state, the green-light state, the yellow-light state, the all-off state and other states; and confidences of the red-light state, the green-light state, and the yellow-light state are identical, the confidences of the red-light state, the green light-state, and the yellow-light state are greater than a confidence of the all-off state, and the confidence of the all-off state is greater than a confidence of other states.

The above apparatus may execute the method according to any of the above embodiments of the present disclosure, and have corresponding function modules for executing the above method and beneficial effects. The technical details not illustrated in detail in this embodiment may refer to the method according to the above embodiments of the present disclosure.

Third Embodiment

Figure 4:
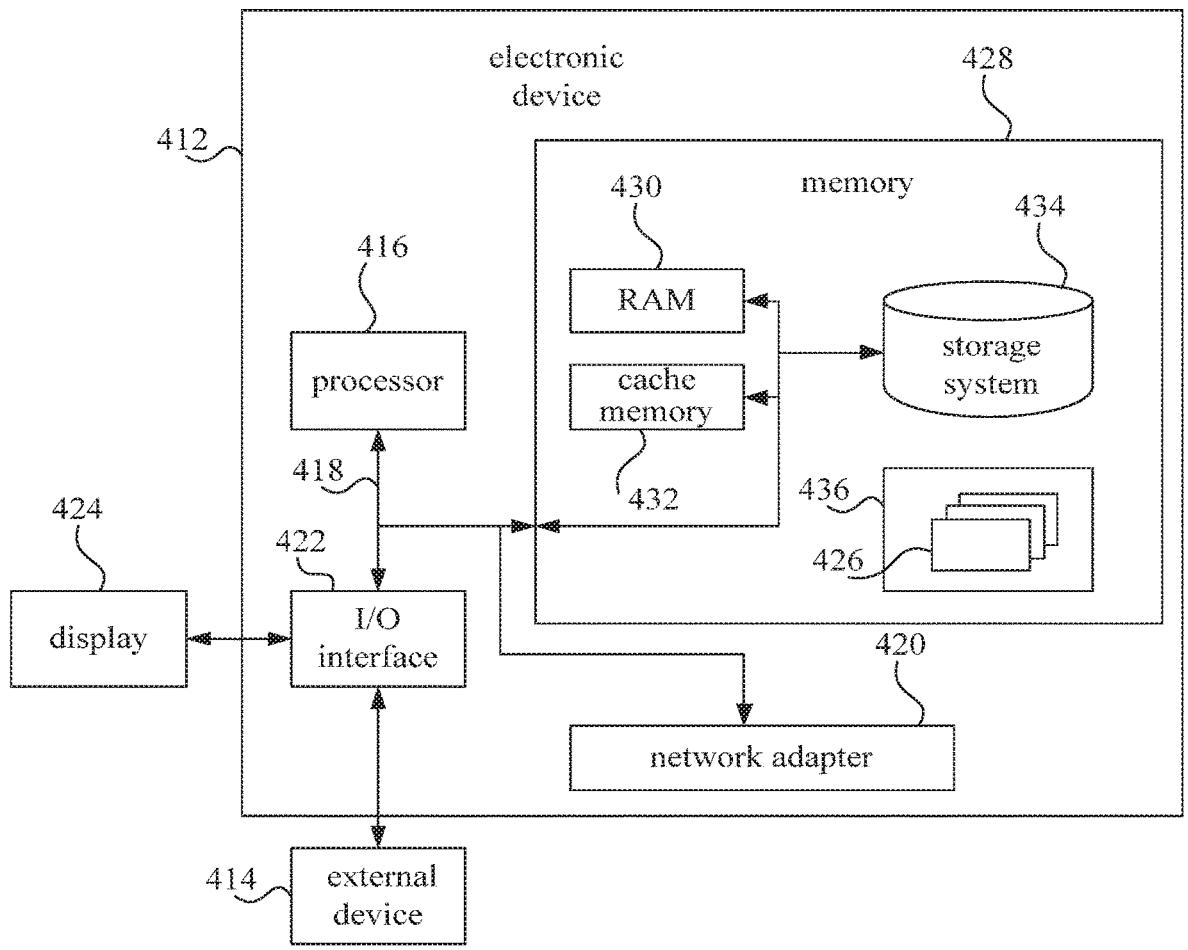
FIG. 4 is a schematic diagram illustrating an electronic device in a third embodiment of the present disclosure.

FIG. 4 is a schematic diagram illustrating an electronic device in the third embodiment of the present disclosure. FIG. 4 illustrates a schematic diagram of an electronic device 412 applicable to implement embodiments of the present disclosure. The electronic device 412 illustrated in FIG. 4 is only an example, which may not bring any limitation to functions and application scope of embodiments of the present disclosure. The electronic device 412 is a computer device having a function for recognizing a traffic light typically.

As illustrated in FIG. 4, the electronic device 412 is presented in form of a general-purpose computing device. Components of the electronic device 412 may include but not be limited to: one or more processors 416, a memory device 428, and a bus 418 connecting different system components (including the memory device 428 and the processor 416).

The bus 418 represents one or more of several bus architectures, including a memory bus, a memory controller, a peripheral bus, a graphics acceleration port, a processor, or a local bus with any bus architecture in a plurality of bus architectures. For example, these architectures include but are not limited to an industry standard architecture (ISA) bus, a micro channel architecture (MCA) bus, an enhanced ISA bus, a video electronics standards association (VESA) local bus and a peripheral component interconnection (PCI) bus.

The electronic device 412 typically includes a variety of computer system readable mediums. These mediums may be any usable medium that may be accessed by the electronic device 412, including volatile and non-volatile mediums, removable and non-removable mediums.

The memory device 428 may include computer system readable mediums in the form of volatile memory, such as a random-access memory (RAM) 430 and/or a cache memory 432. The electronic device 412 may further include other removable/non-removable, volatile/non-volatile computer system storage mediums. Only as an example, the storage system 434 may be configured to read from and write to non-removable, non-volatile magnetic mediums (not illustrated in FIG. 4, and usually called "a hard disk driver"). Although not illustrated in FIG. 4, a magnetic disk driver configured to read from and write to the removable non-volatile magnetic disc (such as "a diskette"), and an optical disc driver configured to read from and write to a removable non-volatile optical disc (such as a compact disc-read only memory (CD-ROM), a digital video disc-read only memory (DVD-ROM) or other optical mediums) may be provided. Under these circumstances, each driver may be connected to the bus 418 by one or more data medium interfaces. The memory device 428 may include at least one program product. The program product has a set of program modules (for example, at least one program module), and these program modules are configured to execute functions of respective embodiments of the present disclosure.

A program 436, having a set (at least one) of program modules 426, may be stored, for example, in the memory device 428. Such program modules 426 include but are not limited to an operating system, one or more application, other program modules, and program data. Each or any combination of these examples may include an implementation of a networking environment. The program module 426 usually executes functions and/or methods described in embodiments of the present disclosure.

The electronic device 412 may communicate with one or more external devices 414 (such as a keyboard, a pointing device, and a display 424), may also communicate with one or more devices enabling a user to interact with the electronic device 412, and/or may communicate with any device (such as a network card, and a modem) enabling the electronic device 412 to communicate with one or more other computing devices. Such communication may occur via an input/output (I/O) interface 422. Moreover, the electronic device 412 may further communicate with one or more networks (such as a local area network (LAN), a wide area network (WAN) and/or a public network, such as Internet) via a network adapter 420. As illustrated in FIG. 4, the network adapter 420 communicates with other modules of the electronic device 412 via the bus 418. It should be understood that, although not illustrated in FIG. 4, other hardware and/or software modules may be used in combination with the electronic device 412, including but being not limited to: microcode, device drivers, redundant processing units, external disk drive arrays, RAID (redundant array of independent disks) systems, tape drives, and data backup storage systems, etc.

The processor 416, by operating programs stored in the memory device 428, executes various function applications and data processing, for example implementing a method for recognizing a traffic light provided in above embodiments of the present disclosure.

Fourth Embodiment

The fourth embodiment of the present disclosure also provides a computer readable storage medium having a computer program stored thereon. When executed by a processor, the computer program is configured to implement the method for recognizing a traffic light provided by embodiments of the present disclosure.

It is to be understood that the computer program stored on the computer readable storage medium provided by embodiments of the present disclosure is not limited to perform the method described above, and may also perform related operations in the method for recognizing the traffic light provided by any of embodiments of the present disclosure.

The computer storage medium in embodiments of the present disclosure may employ any combination of one or more computer readable mediums. The computer readable medium may be a computer readable signal medium or a computer readable storage medium. The computer readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The transmitted data signal may employ a plurality of forms, including but not limited to an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

Figure 5:
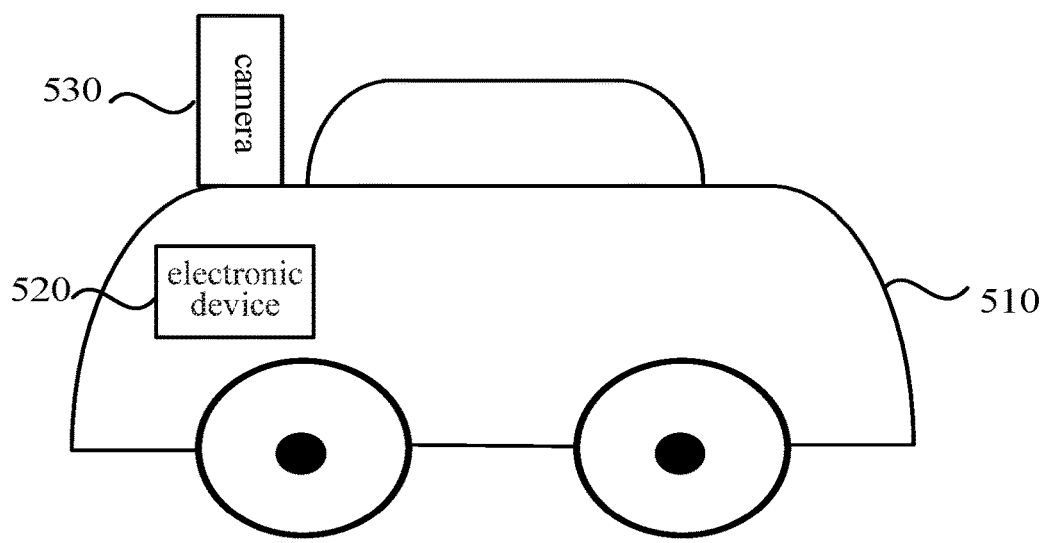
FIG. 5 is a schematic diagram illustrating a vehicle in a fourth embodiment of the present disclosure.

Further, FIG. 5 is a block diagram illustrating a vehicle in the fourth embodiment of the present disclosure. As illustrated in FIG. 5, the vehicle includes a vehicle body 510, the electronic device 520 according to the above embodiments, and a camera 530 provided on the vehicle body.

The description above only represents some of the embodiments of the present disclosure and technical principle applied thereto. It should be understood by one of skill in the art that, the present disclosure is not limited to the specific embodiment described herein. The skilled in the art may make various obvious changes, modifications and alternatives without departing from the scope of the present disclosure. Therefore, although a specific illustration is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A method for recognizing a traffic light, comprising:
   processing image frames captured by a camera to obtain semantic information of one or more traffic lights provided at an intersection, and recognize states of the one or more traffic lights in the image frames;
   determining traffic lights representing same semantics from the one or more traffic lights based on the semantic information, and determining a uniform state corresponding to the traffic lights representing the same semantics according to states of the traffic lights representing the same semantics and preset confidences of respective traffic light states;
   determining indication information of the traffic lights representing the same semantics according to the uniform state;
   in response to obtaining the uniform state every time, recording the uniform state when the uniform state is one of: an all-off state, a green-light state, a yellow-light state, and a red-light state; and
   determining whether there is a traffic light in a blink state among the traffic lights representing the same semantics or whether the traffic lights representing the same semantics are in a fault state according to the uniform state recorded and a frequency of image frame processing.

2. The method according to claim 1, wherein obtaining the semantic information of one or more traffic lights provided at the intersection, and recognizing the states of the one or more traffic lights according to the image captured by the camera comprise:
   obtaining location information of the one or more traffic lights provided at the intersection and the semantic information of the one or more traffic lights based on map data; and
   determining position of the one or more traffic lights in the image captured by the camera based on the location information, and recognizing the states of the one or more traffic lights at the position.

3. The method according to claim 1, wherein determining the uniform state corresponding to the traffic lights representing the same semantics according to the states of the traffic lights representing the same semantics and the preset confidences of respective traffic light states comprises:

determining confidences respectively corresponding to the states of the traffic lights representing the same semantics based on the preset confidences of the respective traffic light states; and selecting a state with a maximum confidence from the confidences respectively corresponding to the states of the traffic lights representing the same semantics as the uniform state.

4. The method according to claim 3, wherein selecting the state with the maximum confidence from the confidences respectively corresponding to the states of the traffic lights representing the same semantics as the uniform state comprises:

in response to determining that a number of the state with the maximum confidence is one, taking the state with the maximum confidence as the uniform state;

in response to determining that the number of the states with the maximum confidence is more than one, selecting a state corresponding to a maximum number of traffic lights from the states with the maximum confidence as the uniform state;

in response to determining that a number of the state corresponding to the maximum number of traffic lights is one, taking the state corresponding to the maximum number of traffic lights as the uniform state; and in response to determining that the number of the states corresponding to the maximum number of traffic lights is more than one, taking a state with a lowest confidence in the preset confidences as the uniform state.

5. The method according to claim 1, after determining the uniform state corresponding to the traffic lights representing the same semantics, and before determining the indication information of the traffic lights representing the same semantics according to the uniform state, further comprising:

correcting the uniform state according to historical state information corresponding to the traffic lights representing the same semantics.

6. The method according to claim 5, wherein, correcting the uniform state according to the historical state information corresponding to the traffic lights representing the same semantics comprises at least one of:

correcting the uniform state to a state at a last time point corresponding to the traffic lights representing the same semantics when the uniform state is a shielded state;

when the uniform state is an all-off state and the state at the last time point corresponding to the traffic lights representing the same semantics is not the shielded state, correcting the uniform state to the state at the last time point corresponding to the traffic lights representing the same semantics; and when the uniform state is a yellow-light state and the state at the last time point corresponding to the traffic lights representing the same semantics is a red-light state, correcting the uniform state to the red-light state.

7. The method according to claim 1, wherein determining whether there is the traffic light in the blink state among the traffic lights representing the same semantics or whether the traffic lights representing the same semantics are in the fault state according to the uniform state recorded and the frequency of image frame processing comprises:

determining that the traffic lights representing the same semantics are in the fault state in response to determining that a duration of the uniform state being the all-off state is greater than an upper limit value of a preset range according to the uniform state recorded and the frequency of image frame processing;

determining that there is a traffic light in an abnormal blink state among the traffic lights representing the same semantics in response to determining that the uniform state is a state alternating between an on-state and the off-state and a duration of the off-state is lower than a lower limit value of the preset range according to the uniform state recorded and the frequency of image frame processing; and determining there is a traffic light in a normal blink state among the traffic lights representing the same semantics in response to determining that the uniform state is the state alternating between the on-state and the off-state and the duration of the off state is within the preset range according to the uniform state recorded and the frequency of image frame processing.

8. The method according to claim 1, wherein the traffic light states comprise the red-light state, the green-light state, the yellow-light state, the all-off state and the shielded state; and confidences of the red-light state, the green-light state, and the yellow-light state are identical, the confidences of the red-light state, the green light-state, and the yellow-light state are greater than a confidence of the all-off state, and the confidence of the all-off state is greater than a confidence of the shielding state.

9. An electronic device comprising: a memory, a processor, and a computer program stored on the memory and executable by the processor, wherein, when the computer program is executed by the processor, a method for recognizing a traffic light is implemented, and the method comprising:

processing image frames captured by a camera to obtain semantic information of one or more traffic lights provided at an intersection, and recognize states of the one or more traffic lights in the image frames;

determining traffic lights representing same semantics from the one or more traffic lights based on the semantic information, and determining a uniform state corresponding to the traffic lights representing the same semantics according to states of the traffic lights representing the same semantics and preset confidences of respective traffic light states;

determining indication information of the traffic lights representing the same semantics according to the uniform state;

in response to obtaining the uniform state every time, recording the uniform state when the uniform state is one of: an all-off state, a green-light state, a yellow-light state, and a red-light state; and determining whether there is a traffic light in a blink state among the traffic lights representing the same semantics or whether the traffic lights representing the same semantics are in a fault state according to the uniform state recorded and a frequency of image frame processing.

10. The electronic device according to claim 9, wherein obtaining the semantic information of one or more traffic lights provided at the intersection, and recognizing the states of the one or more traffic lights according to the image captured by the camera, comprise:

obtaining location information of the one or more traffic lights provided at the intersection and the semantic information of the one or more traffic lights based on map data; and determining position of the one or more traffic lights in the image captured by the camera based on the location information, and recognizing the states of the one or more traffic lights at the position.

11. The electronic device according to claim 9, wherein determining the uniform state corresponding to the traffic lights representing the same semantics according to the states of the traffic lights representing the same semantics and the preset confidences of respective traffic light states comprises:

determining confidences respectively corresponding to the states of the traffic lights representing the same semantics based on the preset confidences of the respective traffic light states; and selecting a state with a maximum confidence from the confidences respectively corresponding to the states of the traffic lights representing the same semantics as the uniform state.

12. The electronic device according to claim 11, wherein selecting the state with the maximum confidence from the confidences respectively corresponding to the states of the traffic lights representing the same semantics as the uniform state comprises:

in response to determining that a number of the state with the maximum confidence is one, taking the state with the maximum confidence as the uniform state;

in response to determining that the number of the states with the maximum confidence is more than one, selecting a state corresponding to a maximum number of traffic lights from the states with the maximum confidence as the uniform state;

in response to determining that a number of the state corresponding to the maximum number of traffic lights is one, taking the state corresponding to the maximum number of traffic lights as the uniform state; and in response to determining that the number of the states corresponding to the maximum number of traffic lights is more than one, taking a state with a lowest confidence in the preset confidences as the uniform state.

13. The electronic device according to claim 9, wherein after determining the uniform state corresponding to the traffic lights representing the same semantics, and before determining the indication information of the traffic lights representing the same semantics according to the uniform state, the method further comprises:

correcting the uniform state according to historical state information corresponding to the traffic lights representing the same semantics.

14. The electronic device according to claim 13, wherein correcting the uniform state according to the historical state information corresponding to the traffic lights representing the same semantics comprises at least one of:

correcting the uniform state to a state at a last time point corresponding to the traffic lights representing the same semantics when the uniform state is a shielded state;

when the uniform state is an all-off state and the state at the last time point corresponding to the traffic lights representing the same semantics is not the shielded state, correcting the uniform state to the state at the last time point corresponding to the traffic lights representing the same semantics; and when the uniform state is a yellow-light state and the state at the last time point corresponding to the traffic lights representing the same semantics is a red-light state, correcting the uniform state to the red-light state.

15. The electronic device according to claim 9, wherein determining whether there is the traffic light in the blink state among the traffic lights representing the same semantics or whether the traffic lights representing the same semantics are in the fault state according to the uniform state recorded and the frequency of image frame processing comprises:

determining that the traffic lights representing the same semantics are in the fault state in response to determining that a duration of the uniform state being the all-off state is greater than an upper limit value of a preset range according to the uniform state recorded and the frequency of image frame processing;

determining that there is a traffic light in an abnormal blink state among the traffic lights representing the same semantics in response to determining that the uniform state is a state alternating between an on-state and the off-state and a duration of the off-state is lower than a lower limit value of the preset range according to the uniform state recorded and the frequency of image frame processing; and determining there is a traffic light in a normal blink state among the traffic lights representing the same semantics in response to determining that the uniform state is the state alternating between the on-state and the off-state and the duration of the off state is within the preset range according to the uniform state recorded and the frequency of image frame processing.

16. The electronic device according to claim 9, wherein the traffic light states comprise the red-light state, the green-light state, the yellow-light state, the all-off state and the shielded state; and confidences of the red-light state, the green-light state, and the yellow-light state are identical, the confidences of the red-light state, the green light-state, and the yellow-light state are greater than a confidence of the all-off state, and the confidence of the all-off state is greater than a confidence of the shielding state.

17. A vehicle comprising: a vehicle body, an electronic device, and a camera provided on the vehicle body, the electronic device comprising: a memory, a processor, and a computer program stored on the memory and executable by the processor, wherein, when the computer program is executed by the processor, a method for recognizing a traffic light is implemented, and the method comprising:

processing image frames captured by the camera to obtain semantic information of one or more traffic lights provided at an intersection, and recognize states of the one or more traffic lights in the image frames;

determining traffic lights representing same semantics from the one or more traffic lights based on the semantic information, and determining a uniform state corresponding to the traffic lights representing the same semantics according to states of the traffic lights representing the same semantics and preset confidences of respective traffic light states;

determining indication information of the traffic lights representing the same semantics according to the uniform state;

in response to obtaining the uniform state every time, recording the uniform state when the uniform state is one of: an all-off state, a green-light state, a yellow-light state, and a red-light state; and determining whether there is a traffic light in a blink state among the traffic lights representing the same semantics or whether the traffic lights representing the same semantics are in a fault state according to the uniform state recorded and a frequency of image frame processing.

18. The vehicle according to claim 17, wherein obtaining the semantic information of one or more traffic lights provided at the intersection, and recognizing the states of the one or more traffic lights according to the image captured by the camera, comprise:

obtaining location information of the one or more traffic lights provided at the intersection and the semantic information of the one or more traffic lights based on map data; and determining position of the one or more traffic lights in the image captured by the camera based on the location information, and recognizing the states of the one or more traffic lights at the position.

* * * * *